March 14, 1961   F. F. BRANCH ET AL   2,974,770
MOTOR VEHICLE FAN CLUTCH ASSEMBLY
Filed May 27, 1957   3 Sheets-Sheet 1

INVENTORS
HARMON L. SHAW &
FRANK F. BRANCH
BY
Parrott & Richards
ATTORNEYS

March 14, 1961   F. F. BRANCH ET AL   2,974,770
MOTOR VEHICLE FAN CLUTCH ASSEMBLY Filed May 27, 1957   3 Sheets-Sheet 2

INVENTORS
HARMON L. SHAW &
BY FRANK F. BRANCH

*Parrott & Richards*
ATTORNEYS

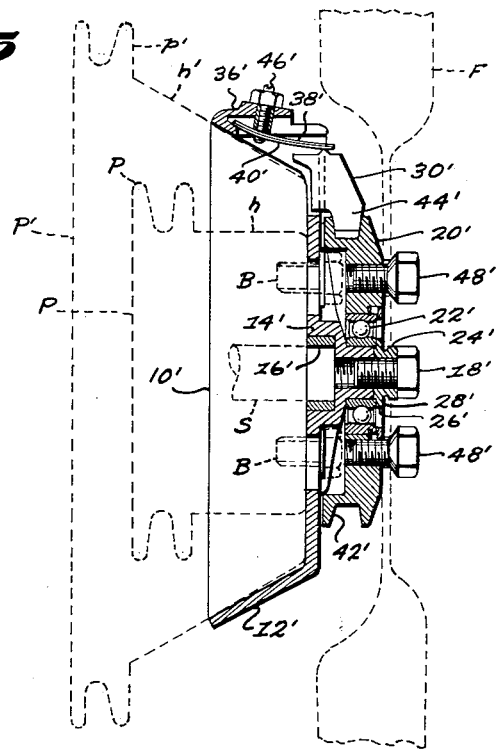
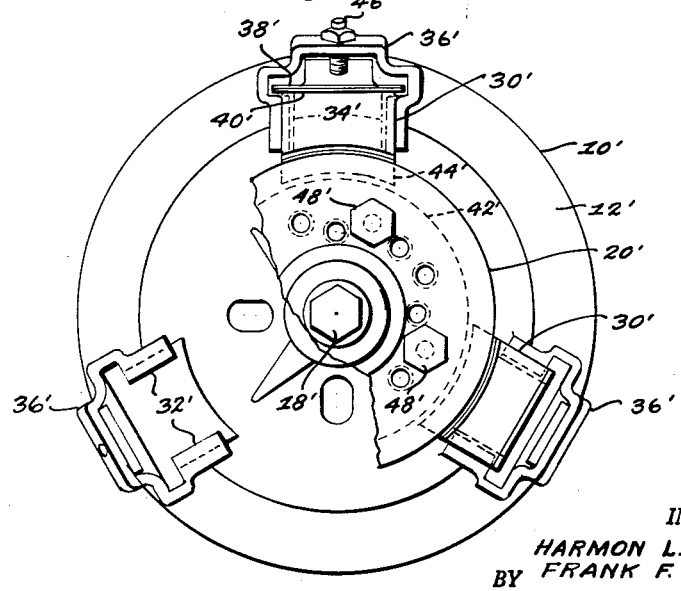

United States Patent Office 2,974,770
Patented Mar. 14, 1961

2,974,770
MOTOR VEHICLE FAN CLUTCH ASSEMBLY

Frank F. Branch and Harmon L. Shaw, Charlotte, N.C., assignors to Product Development & Sales Co., a corporation of North Carolina Filed May 27, 1957, Ser. No. 661,878
1 Claim. (Cl. 192—104)

This invention relates generally to radiator cooling fans for motor vehicles and the like, and more particularly to a clutch assembly for such fans that is arranged to unique advantage for automatically disconnecting the fan drive at high motor operating speeds when fan cooling is not needed, while normally maintaining the fan connected for operation at ordinary speeds in the usual manner.

As is well known, a motor vehicle radiator cooling fan is conventionally arranged on a driving pulley carried by a stub shaft, commonly the water pump shaft with the driving pulley connected to be driven from the motor so that its operating speed is determined by the motor operating speed. At ordinary operating speeds the fan performs the necessary function of drawing air through the radiator so that the cooling water circulated therethrough is returned to the motor at a sufficiently low temperature to prevent overheating. As the operating speed or velocity of the motor vehicle is increased, however, natural air movement through the radiator is likewise increased, and a point is soon reached at which the fan action is unnecessary and simply imposes a wasteful power drag on the motor. The prior art has recognized this to be so and contains a number of proposals for eliminating the fan action when not needed, but these prior proposals have been characterized by impractical mechanical complication and have in general required substantial modification of the conventional fan arrangement.

The fan clutch assembly of the present invention is adapted for installation to control the operation of any conventionally arranged cooling fan by simply interposing it in the fan drive, and the structure of the assembly is such that very little more space is needed for its installation than was previously occupied by the fan. Generally described, this fan clutch assembly, as provided according to the present invention, comprises a carrier member that is mountable on the above mentioned driving pulley in place of the fan, a hub member that is rotatably mountable on the carrier member in axial alignment with the driving pulley and arranged to have the fan fixed thereon, and a plurality of actuator blocks radially slidable on the carrier member in peripheral relation with respect to the hub member and biased on the carrier member for normally sliding inward to engage the hub member and thereby cause rotation of the fan from the driving pulley, while having sufficient mass for overcoming the bias thereon by centrifugal force so as to slide outward and thereby disengage the hub member to disconnect the fan from the driving pulley at high motor operating speeds.

A representative embodiment of the present invention is described in further detail below in connection with the accompanying drawings, in which.

Figure 1:
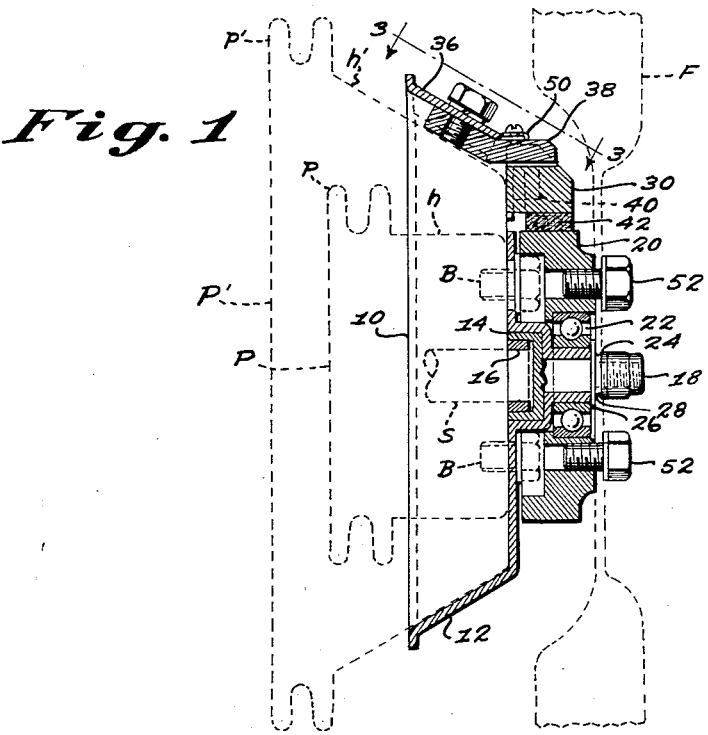
Fig. 1 is a vertical section detail of a fan clutch assembly embodying the present invention, with the installed relation of the assembly indicated in dotted lines.
Figure 2:
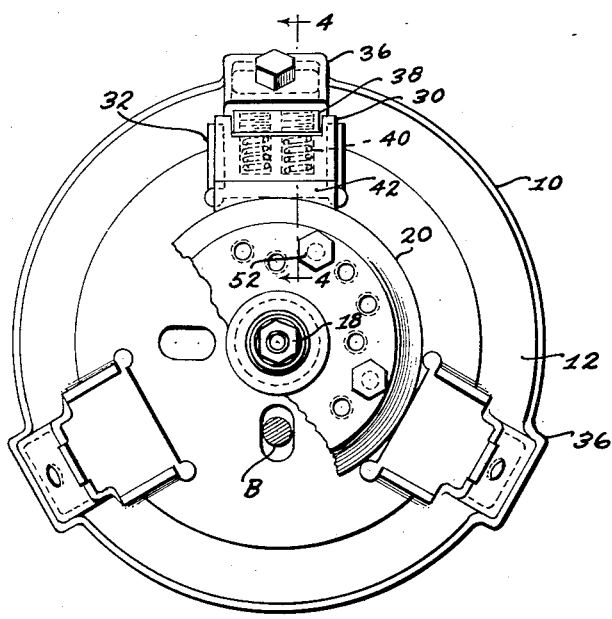
Fig. 2 is an elevation, partly broken away, of the fan clutch assembly substantially as seen from the right in Fig. 1.
Figure 3:
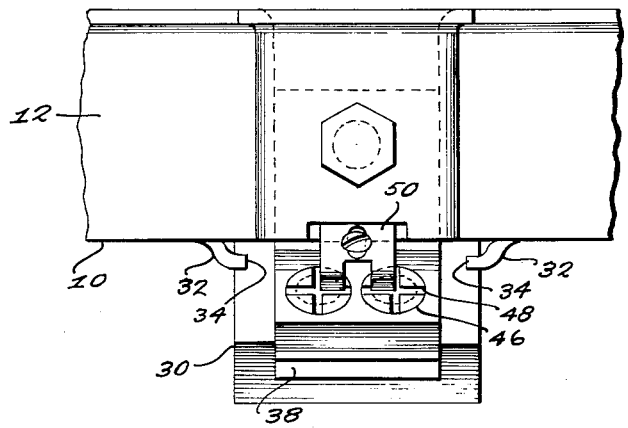
Fig. 3 is a fragmentary top plan view corresponding generally to Fig. 2.
Figure 4:
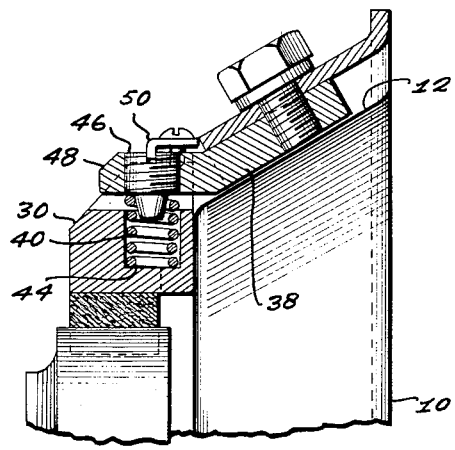

Fig. 4 is a fragmentary section detail taken substantially at the line 4—4 in Fig. 3; and Figs. 5 and 6 are further section and elevation details corresponding, respectively, to Figs. 1 and 2, but showing a modified embodiment of the present invention.

Referring now in detail to the drawings, and more particularly at first to Fig. 1, the reference character F indicates a motor cooling fan of the type conventionally secured by bolts B on a driving pulley, such as P or P', carried by a stub shaft S, the driving pulley P or P' having a hub portion $h$ or $h'$ at the side face of which the bolts B are received, and a pulley flange $p$ or $p'$ offset on the hub portion $h$ or $h'$, with respect to the extending end of the stub shaft S, for driving connection with the motor to rotate the fan F normally at a speed determined by the operating speed of the motor.

According to the present invention, a carrier member 10 is provided for mounting on the drive pulley P or P' in place of the fan F, the fan bolts B being employed to secure the carrier member 10 at the side face of the pulley hub portion $h$ or $h'$. This carrier member 10 is peripherally flanged at 12 for nesting concentrically over the hub portions $h$ and $h'$ of the conventional range of sizes for the driving pulleys P or P' as illustrated in Fig. 1. Also, the carrier member 10 is formed with a central cylindrical stem portion 14 at the face thereof directed away from the peripheral flange 12, and this stem portion 14 is counterbored at its base to receive a bushing 16 for axial alignment thereat on the extending end of the stub shaft S.

The stem portion 14 is also shouldered to a reduced diameter at its extending end and threaded to receive a fastening means 18 by which a hub member 20 is secured for rotation thereon. The hub member 20 is fitted centrally with a bearing unit 22 and the stem portion 14 serves as a spindle to carry this bearing unit 22, a special washer element 24 being provided at the fastening means 18 to clamp the inner race of bearing unit 22 in place. The washer element 24 is special in that it has a main body portion of substantial thickness with an opposing face adapted for bottoming at the shoulder of stem portion 14 and extending annularly as a clamping flange 26 with a circumferential relief groove 28 formed at the opposite side thereof in the main body portion of washer element 24. By this arrangement, the clamping flange 26 is rendered sufficiently flexible to allow bottoming of the washer element 24, despite ordinary tolerance variations, at the shoulder of stem portion 14 while clamping the bearing unit 22 in place, so that the stem portion 14 is protected from undue tension strain no matter how tightly the fastening means 18 is turned down.

As seen in Figs. 1 and 2, the hub member 20 is of smaller diameter than the carrier member 10 so that a plurality of actuator blocks 30 may be arranged on carrier member 10 in peripheral relation to hub member 20 for selective engagement therewith. For this purpose, the side face of carrier member 10 adjacent hub member 20 is formed with pairs of opposing guide flanges 32 at radial slots therein to engage side face grooves 34 in the actuator blocks 30 and thereby provide radial slideways for these actuator blocks 30. In addition, the peripheral flange 12 of carrier member 10 has housing portions 36 formed thereat in which arm members 38 may be fitted at the outer ends of the above noted radial slideways so as to provide for supporting biasing means 40 by which the actuator blocks 30 are normally urged to slide inward and frictionally engage hub member 20 peripherally for rotation with carrier member 10. The circumferential surface of hub member 20 is preferably cylindrical in form, and the actuator blocks 30 are fitted with friction facings 42 shaped for seating at the circumferential surface of hub member 20.

The actuator blocks 30 are further characterized by a mass sufficient for overcoming by centrifugal force the bias means 38 thereat so as to slide outward on carrier member 10 and disconnect hub member 20 therefrom. Each bias means 40 conveniently comprises a pair of coil springs that are seated in recesses 44 formed in the actuator blocks 30 and that are set to a proper bias by adjusting screws 46 carried by the arm members 38 (see Figs. 3 and 4). The adjusting screws 46 have crossed slots 48 formed in the heads thereof, and each arm member 38 is fitted with a lock plate 50 arranged to be secured thereon in engagement with the adjusting screw slots 48 to lock them at a given setting. Finally, the exposed side face of hub member 20 is arranged to receive a new set of fan bolts 52 for securing the fan F in fixed relation thereon.

The manner of installing the above described fan clutch assembly for operation under usual conditions is as follows. Having a stub shaft S (e.g., a water pump shaft) on which a driving pulley P or P' is conventionally arranged to carry a radiator fan F fixed at the side face thereof by bolts B, the first installation step is to mount the carrier member 10 on the driving pulley P or P' in place of the fan F. For this purpose, the carrier member 10 is fitted with the bushing 16 for alignment on the extending end of stub shaft S and, as thus aligned, is then fixed on the driving pulley P or P' by the fan bolts B. Next the hub member 20 is arranged on the central stem portion 14 of carrier member 10 using the fastening means 18 to secure it in place thereon for free rotation. With hub member 20 in place, the actuator blocks 30 are then inserted at the radial slideways provided therefor on the carrier member 10 and the biasing coil springs 40 are located and set to bias the actuator blocks 30 as illustrated in Fig. 4, after which the radiator fan F may be secured on the hub member 20 by the additional set of fan bolts 52 provided therefor to complete the installation.

As thus installed, the hub member 20 is normally engaged by the inwardly biased actuator blocks 30 arranged on the carrier member 10 so that the radiator fan F will be rotated from the driving pulley P or P' at ordinary speeds, but will be disconnected to an idling condition upon any speed increase sufficient to apply a great enough centrifugal force through the actuator blocks 30 to overcome the bias of the coil springs 40 and thereby result in outward shifting of the actuator blocks 30 to disengage hub member 20. By suitable adjustment of the screws 46 the bias of the coil springs 40 may be be set to maintain the actuator blocks 30 in engagement for driving the radiator fan under all conditions at which it is needed, while allowing it to be released automatically at high operating speeds when it is not needed and when it actually represents a useless power drag. Upon such release, it should also be noted that the arm members 38 arranged on the carrier member 10 to support the biasing means 40 additionally serve to limit the outward shifting of the actuator blocks 30 and contain them positively on the carrier member 10 at high operating speeds so that the biasing means 40 can be properly provided for biasing the actuator blocks 30 to the best advantage without having also to resist the maximum centrifugal force that can be exerted by the actuator blocks 30.

The modified embodiment shown in Figs. 5 and 6 may be employed to advantage where operating conditions will allow use of a lighter weight and less sturdy construction. According to this embodiment, a carrier member 10' and hub member 20' are arranged in the same general manner employed in the first described embodiment, the carrier member 10' having a peripheral flange 12' proportioned for nesting concentrically over the hub portions h or h' of driving pulleys P or P' in a conventional range of sizes, as indicated, and being formed for attachment to the driving pulleys P or P' in place of the fan F by means of the fan bolts B. Also, the carrier member 10' is aligned with the pulley stub shaft S at a central boss or stem portion 14' that is counterbored to receive a shaft bushing 16' and that extends from the opposite face of carrier member 10' as a spindle on which the hub member 20' is rotatably secured in place by fastening means 18'. For this purpose the hub member 20' is fitted with a bearing unit 22' and the fastening means 18' is provided with a special washer element 24' having an annular clamping flange 26' and relief groove 28' arranged for clamping the hub member bearing unit 22' effectively in place on the boss portion 14' in the manner previously noted in connection with the first described embodiment.

The carrier member 10' of the present embodiment is further arranged to carry actuator blocks 30' in peripheral relation to hub member 20' at pairs of opposing guide flanges 32' forming radial slideways therein in which the actuator blocks 30' may be slidably positioned at side face grooves 34' therein. In addition, the peripheral flange 12' of carrier member 10' has housing portions 36' formed thereat in which bias means comprising laminated leaf springs 38' and 40' are positioned at the outer ends of the above noted radial slideways so as to provide for biasing the actuator blocks 30' inwardly to engage hub member 20'.

The hub member 20' of the present embodiment is differently formed in that it incorporates a depthwise tapering peripheral groove 42', and the actuator blocks 30' have tapered inner end portions 44' shaped for seating at the groove 42'. The actuator blocks 30' are characterized, as before, by a mass sufficient for overcoming by centrifugal force the bias means formed by laminated leaf springs 38' and 40' thereat so as to slide outward and disconnect hub member 20' at high operating speed. The laminated leaf springs 38' and 40' forming the bias means for actuator blocks 20' are specially formed in that they are provided in an aggregate thickness sufficient to prevent any permanent set and consequent loss of biasing action therein, while remaining sufficiently flexible because of their laminated arrangement to apply a bias that is not so overpowering as to prevent effective centrifugal action of the actuator blocks 20'. The laminated leaf springs 38' and 40' are suitably secured as a unit by spot welding (not shown) adjacent the end thereof that is fulcrummed within the carrier member housing portions 36' and are also apertured for locating engagement by dog pointed set screws 46' adjustably arranged at each housing portion 36'. The fan F, again as in the previously described embodiment, is secured at the exposed side face of hub member 20' by a new set of fan bolts 48', so as to arrange the present embodiment for operation in the same manner already described at length.

The present invention has been described in detail above for purposes of illustration only and is not intended to be limited by this description or otherwise except as defined in the appended claim.

We claim:

A fan clutch assembly comprising, for combination with a motor vehicle radiator cooling fan normally mounted adjacent the extending end of a stub shaft at the side face of a driving pulley hub portion carried on said stub shaft with a pulley flange offset thereon from the extending end of said stub shaft and connected to rotate said fan at a speed determined by the operating speed of the motor of said vehicle, a carrier member mountable sidewise on said pulley hub portion in place of said fan, said carrier member being flanged peripherally for nesting concentrically over said pulley hub portion and being formed with a central cylindrical stem portion at which said carrier member is aligned axially with said stub shaft when mounted on said pulley hub portion, a hub member rotatably mountable on said carrier member stem portion at the side of said carrier member opposite said pulley hub portion and coaxially with respect to said stub shaft adjacent the extending end thereof, said hub member being formed in correspondence with the side face of said driving pulley hub portion to have said pulley mounted fan fixed interchangeably thereon and being fitted centrally with a bearing unit for mounting on said carrier member stem portion, the extending end of said stem portion being shouldered to a reduced diameter and threaded for engaging a threaded fastening means to secure said bearing unit in place thereon, said fastening means including a washer element having an opposing face bottoming at said stem portion shoulder and extending annularly for clamping said bearing unit in place, and said washer element being formed sufficiently flexible to insure bottoming of said opposing face on said stem portion while clamping said bearing unit, and a plurality of actuator blocks mounted on said carrier member in peripheral relation with respect to said hub member for selective engagement therewith, the side face of said carrier member adjacent said hub member being formed with radial slideways for carrying said actuator blocks and the peripheral flange of said carrier member being fitted for supporting bias means at the outer ends of said radial slideways for biasing said actuator blocks normally to slide inward and engage said hub member and thereby cause rotation of said fan from said driving pulley, and said actuator blocks having sufficient mass for overcoming said bias by centrifugal force so as to slide outward and thereby disengage said hub member to disconnect said fan from said driving pulley at high operating speeds of said motor.

References Cited in the file of this patent

UNITED STATES PATENTS

| | | |
|---|---|---|
| 928,679 | Mather | July 20, 1909 |
| 2,005,468 | Modine | June 18, 1935 |
| 2,758,689 | Spase | Aug. 14, 1956 |
| 2,762,482 | Davis | Sept. 11, 1956 |
| 2,781,167 | Sanders | Feb. 12, 1957 |
| 2,806,569 | Keeling | Sept. 17, 1957 |
| 2,819,703 | Suttle | Jan. 14, 1958 |